H. A. Ridley. Cotton Planter.

No. 121,815.        Patented Dec. 12, 1871.

Witnesses:
P. C. Dieterich
Wm. H. C. Smith

Inventor:
H. A. Ridley.
Per ———— Attorneys.

UNITED STATES PATENT OFFICE.

HENRY A. RIDLEY, OF JACKSONPORT, ARKANSAS.

IMPROVEMENT IN COTTON-PLANTERS.

Specification forming part of Letters Patent No. 121,815, dated December 12, 1871.

*To all whom it may concern:*

Be it known that I, HENRY A. RIDLEY, of Jacksonport, in the county of Jackson and State of Arkansas, have invented a new and useful Improvement in Cotton-Planter; and I do hereby declare that the following is a full, clear, and exact description thereof, which will enable others skilled in the art to make and use the same, reference being had to the accompanying drawing forming part of this specification, in which—

Figure 1:
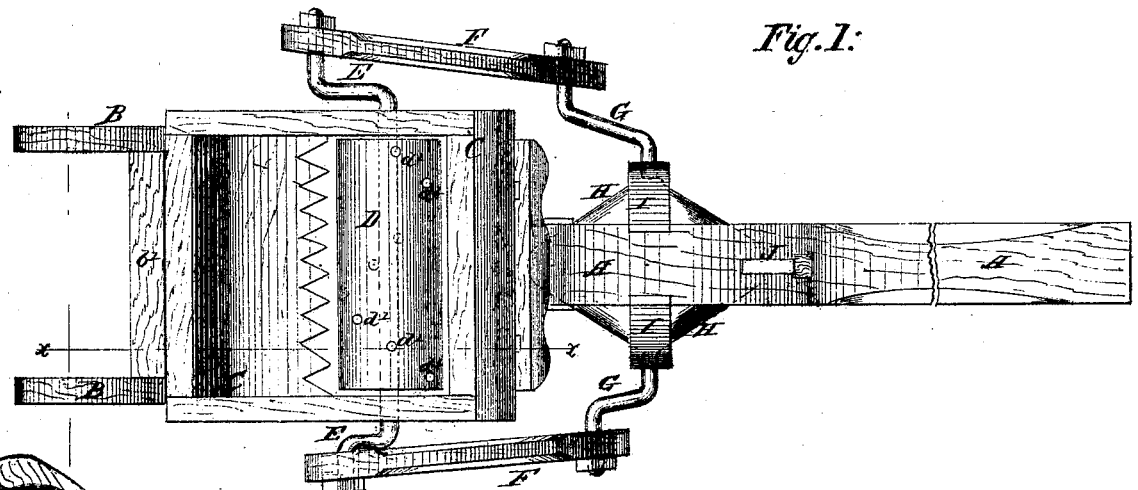
Figure 2:
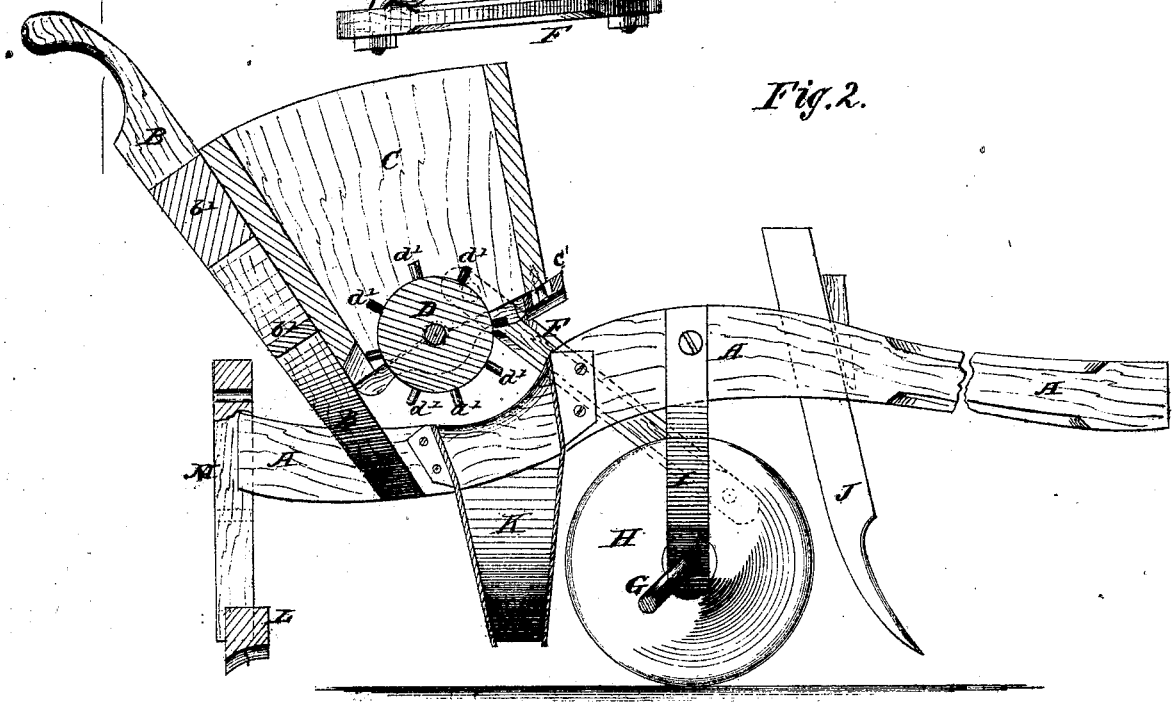

Figure 1 is a top view of my improved planter. Fig. 2 is a side view of the same, partly in section, through the line $x\,x$, Fig. 1.

Similar letters of reference indicate corresponding parts.

My invention has for its object to furnish an improved machine for planting cotton-seed, which shall be simple in construction, convenient in use, and effective in operation, opening the furrow, dropping the seed regularly and uniformly, and covering it to any desired depth. My invention consists in the improvement of cotton-planters, as hereinafter fully described and subsequently pointed out in the claim.

A is the beam, to the forward end of which the draft is attached in the ordinary manner, and to the rear end of which are attached the handles B. The upper parts of the handles B are connected and held in their proper relative positions by the bars or blocks $b'$, placed between and secured to the said handles. C is the seed-hopper, which is placed in front of the handles B, a little above the beam A, and is secured to the bars or blocks $b'$ or to the handles B. To the lower ends of the sides of the seed-hopper C is pivoted the ends of the roller or cylinder D, to the face of which are attached spikes or teeth $d'$, which are arranged spirally, and should make at least an entire circuit of said cylinder. The lower edge of the rear side of the hopper should be notched for the passage of the teeth $d'$, for the double purpose of allowing the cylinder to be placed close to the said rear side of the hopper to prevent the escape of seed at the rear side of the hopper, and to clean the teeth $d'$ of any seed that may adhere to them, and thus prevent the said seed from being again carried up into the hopper or clogging the cylinder. To the lower edge of the forward side of the hopper C is attached a bar or plate, $c'$, which is slotted transversely to receive the screws or bolts by which it is secured to the said hopper. This construction allows the bar $c'$ to be adjusted nearer to or further from the cylinder D to regulate the amount of seed dropped. To the projecting end of each of the journals of the cylinder D is attached, or upon it is formed, a crank, E, to the crank-arm of which is pivoted the rear end of the connecting-rod F. The forward ends of the connecting-rods F are pivoted to the crank-arms of the cranks G, formed upon or attached to the journals of the wheel H, which journals work in bearings in the lower ends of the arms or brackets I, which are attached to the sides of the beam A. The cranks E G are set at an angle with each other, so that there can be no dead-point to the machine. The face of the wheel H is made V-shaped, as shown in Fig. 1, so as to press open the furrow at the same time that it drives the cylinder D and drops the seed. J is the cutter that opens the furrow in front of the wheel H, and at the same time removes any trash or rubbish that may be in the way. The shank of the cutter J passes up through a mortise in the beam A, where it is adjustably secured in place by a wedge, as shown in Figs. 1 and 2. The part of the beam A beneath the discharge-opening of the hopper C is beveled off or made wedge-shaped upon its upper edge, so that it may not obstruct the passage of the cotton-seed to the conductor-spout K, which is made hopper-shaped, is attached to the beam A, and is so arranged as to conduct the seed into the furrow close in the rear of the wheel H. L is the covering-block or plate, the lower side or edge of which is beveled off and concaved to give the desired form to the top of the row or ridge. The covering-block or plate L is attached to the lower end of the standard M, the upper end of which is attached to the rear end of the beam A. Several holes are formed in the standard M to receive the screws or bolts by which it is secured, so that the coverer may be raised or lowered conveniently to cover the seed shallower or deeper, as may be desired.

Having thus described my invention, I claim as new and desire to secure by Letters Patent—

In cotton-planters, a bottomless hopper, C, provided with notches on the lower edge of rear side, combined, as described, with a revolving cylinder, D, serving as bottom of hopper, and provided with spirally-arranged pins $d^2$ to produce an unbroken and continuous delivery of seed into the spout.

HENRY A. RIDLEY.

Witnesses:
WM. K. PATTERSON,
CHARLES MINOR.

(133)